Jan. 27, 1925.
E. H. BELDEN
1,524,078
TIRE CARRIER
Original Filed Sept. 12, 1917
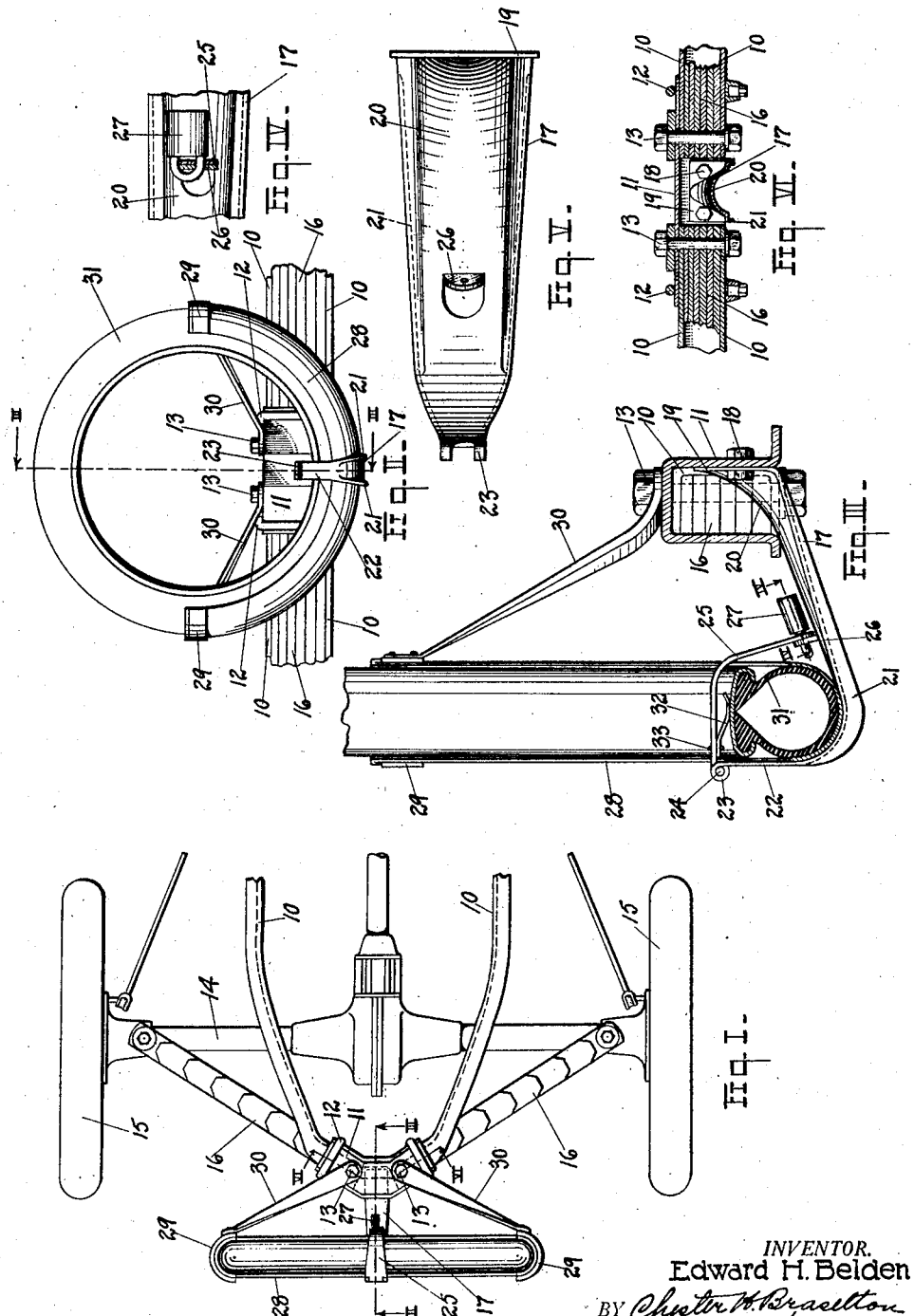
INVENTOR.
Edward H. Belden
BY *Chester H. Braselton*
*Harry W. Lindsey, Jr.*
ATTORNEYS.

Patented Jan. 27, 1925.

1,524,078

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

TIRE CARRIER.

Continuation of application Serial No. 190,965, filed September 12, 1917. This application filed August 26, 1920. Serial No. 406,188.

*To all whom it may concern:*

Be it known that I, EDWARD H. BELDEN, residing at Toledo, county of Lucas, State of Ohio, have invented certain new and useful Improvements in Tire Carriers, of which I declare the following to be a full, clear, and exact description.

The invention relates to tire carriers for motor vehicles and the present application is a continuation of an application filed by me September 12, 1917, bearing Serial Number 190,965.

The invention has for its object to provide a carrier, the parts of which are simple in construction, light in weight, and inexpensive to manufacture and which when assembled afford a strong and rigid support for the spare tire.

Another object of the invention is to provide, in combination with a pair of opposed springs and a connecting member therefor, an improved tire carrier, adapted to be secured to said connecting member intermediate the ends of the springs.

Another object of the invention is to provide an improved tire carrier constructed in such a manner as to form a rigid triangular construction adapted to be supported and braced from a central point on a transverse tie between the side frame members of an automobile.

Another object of the invention is to provide, in combination with a pair of inwardly bent side frame members and a short connection therefor, an improved tire carrier adapted for connection to said parts by the means connecting the same.

Another object of the invention is to provide, in combination with the running gear of an automobile, including side frame channels connected at their rear ends by a cross channel for receiving the inner ends of a pair of opposed springs, a tire carrier bracket adapted for connection to the cross channel between said spring ends and carrying an upstanding tire holding member braced by arms secured upon said cross channel by the means serving to connect the inner adjacent ends of the springs therewith.

A further object of the invention is to provide a tire holding bracket of novel construction having means for yieldingly securing a tire thereon.

To these and other ends the invention comprises certain novel features of construction and arrangement of parts as will be hereinafter more fully pointed out and claimed, it being apparent to those skilled in the art that the invention shown and described herein is susceptible of various modifications, embodiments and arrangements to suit special or varying conditions and I wish it to be understood that the terms which I have used are merely descriptive and not limiting, and that it is my intention to include any and all modifications which come within the scope of the invention as expressed in the appended claims.

A structure constituting one embodiment of my invention is illustrated in the accompanying drawings in which:

Figure I is a plan view of the rear end of a motor vehicle chassis equipped with a tire carrier constructed in accordance with my invention.

Figure II is a view in rear elevation of the tire carried shown in Figure I.

Figure III is a fragmentary sectional elevation taken on lines III—III of Figures I and II.

Figure IV is a detailed fragmentary sectional view taken substantially on line IV—IV of Figure III.

Figure V is a top plan view of the carrier or bracket for supporting the spare tire and Figure VI is a fragmentary sectional elevation taken on line VI—VI of Figure I.

Similar reference numerals refer to similar parts throughout the several views of the drawing.

Referring to the drawing, I have shown the rear end of a motor vehicle comprising the side frame channels 10, the rear ends of which converge toward the longitudinal center of the car where they are connected by the inverted channel 11 into which project the extremities of said channels as shown in Figure III, said channel ends being spaced apart within the inverted channel 11 as indicated by dotted lines in Figure I. The side frame members 10 are connected with the inverted channel 11 preferably by means of the U-bolts 12 as indicated in Figure I and also by means of the bolts 13 as shown in Figures III and VI. Upon the rear axle 14 is mounted the driving wheels 15 and connected with the axle are the converging springs 16, the inner ends of which project into the inverted channel 11 and also into the ends of the side frame channels 10, as best shown in Figure III, the inner ends of said springs being spaced apart within said channels and terminating preferably at points substantially flush with the extremities of the side frame channels 10, the bolts 13 serving the double purpose of connecting the inner ends of the springs 16 and side frame channels 10 within the inverted channel 11, as clearly shown in Figure VI. By spacing the ends of the springs and channel members 10 apart within the inverted channel 11 a recess is provided for the reception of the forward end of the carrier or bracket 17 as indicated in Figure III. The front end of the carrier is positioned wholly within the channel 11 between the ends of the springs 16 and side frame members 10 and is secured therein by means of the bolts 18 extending through the vertical flange 19 of the carrier which rests against the inner face of the forward leg of the channel, as indicated in Figures III and VI. The carrier 17 is provided with a centrally disposed upstanding rib 20 and at its opposite sides with the downturned flanges 21 which extend substantially the full length of the carrier to strengthen and stiffen the same. The rear end of the carrier is turned up as indicated at 22, said upturned portion being provided at its extremity with the hinge knuckles 23 between which is pivoted at 24 the rear end of the hasp or tire holding member 25, the front end of which is bent downwardly to engage the tongue 26 struck upwardly from the rib 20 of the carrier as indicated in Figure V. Openings are provided in the tongue and hasp which may be brought into alignment to permit the shackle of the padlock 27 to pass therethrough in order to lock the hasp against movement. A semi-circular tire holding trough 28 of semi-circular cross-section is secured to and supported at its central point upon the rear end of the carrier 17 which extends beneath the trough, with which it is connected by spot-welding or otherwise as preferred. Semi-circular reenforcing bands 29 are connected with the upper ends of the trough and connected with said bands are the downwardly and inwardly extending braces 30, the lower ends of which rest upon and are connected with the inverted channel 11 by means of the bolts 13 which serve also to connect the springs 16 and channel members 10 with the cross channel 11 as pointed out above. The trough 28 is adapted to receive the spare tire 31 in the manner indicated in Figures II and III and the tire is yieldingly held within the trough by means of a spring 32 secured to the underside of hasp 25 by means of the rivets 33, said spring being tightly pressed into engagement with the rim of the tire when the hasp is in locked position upon the tongue 26. The spring 32 is preferably constructed of flat spring material and is adapted to engage the tire at the center thereof to hold it firmly within the trough and to yieldingly resist any up and down movement of the tire which may be imparted thereto when the vehicle is in service upon the road. The braces 30 not only serve to hold the trough in vertical position but they also assist the carrier 17 in forming a support for the tire and to a large extent they relieve the strain upon the carrier 17 by acting as struts for supporting the trough and tire therein. The carrier 17, trough 28 and braces 30 are all rigidly connected and form a triangular construction made up of relatively light sections of material, but which, by reason of their being combined in the manner shown, serve to produce a rigid support upon which the tire is mounted, it being borne in mind of course that the tire is yieldingly held within the trough by means of the spring 32 and that it is thereby prevented from rattling or vibrating unduly when the machine is driven over rough stretches of roadway. It will be noted that the tire holder is supported and braced from a central point on the cross channel 11 and is connected therewith by the means connecting the side frame members and springs with the cross channel, thus reducing to a minimum the amount of material and number of parts used for supporting the spare tire. By spacing the ends of the springs apart within the U-shaped channel member 11, to permit the securing of the forward end of the carrier bracket 17 within said member I am enabled to mount the tire closer to the body of the car than would otherwise be possible and I thus avoid the overhang and excessive leverage of the carrier arm by reducing the length of said arm to the minimum.

While the form of structure herein shown and described is admirably adapted to fulfill the objects primarily stated, it is to be understood that various changes in form, proportion and minor details of construction may be resorted to without departing from the spirit of the invention as expressed in the appended claims.

What I claim as new and desire to secure by Letters Patent is:

1. A device of the class described, comprising a substantially semi-circular tire receiving trough, a support extending under and connected with said trough and adapted for connection with an automobile frame, a locking arm hinged to said support on one side of said trough and extending across said trough and locked to said support on the opposite side of said trough and a spring tongue carried by said arm and adapted to be engaged by the rim of a tire supported in said trough.

2. A tire carrier comprising an integral supporting member provided with upturned ends, one of which is adapted to be connected with a suitable support, said member being provided at an intermediate point with a tongue struck up therefrom, a tire retaining member hinged to the free end of said member and adapted for connection with said tongue and a leaf spring secured to said tire retaining member to engage a tire held by the said member.

3. In a tire carrying device, a holder for the tire, a bracket adapted to support the holder, a retaining device for the tire including a member hinged to the bracket and adapted for locking engagement therewith, and a spring tongue secured directly upon said member and adapted to yieldingly engage the tire.

In testimony whereof, I affix my signature.

EDWARD H. BELDEN.